United States Patent [19]

Buswell

[11] Patent Number: 5,462,214
[45] Date of Patent: Oct. 31, 1995

[54] BODY MOUNTED CAMERA SUPPORT ASSEMBLY

[76] Inventor: Brian Buswell, Rte. 1, Box 2440, Show Low, Ariz. 85901

[21] Appl. No.: 227,338

[22] Filed: Apr. 14, 1994

[51] Int. Cl.⁶ .................................................. G03B 29/00
[52] U.S. Cl. ........................ 224/224; 224/242; 224/271; 224/908; 352/243; 354/82; 354/293
[58] Field of Search ................... 224/200, 224, 224/225, 242, 252, 271, 272, 908; 352/243; 354/74, 81, 82, 293

[56] References Cited

U.S. PATENT DOCUMENTS

| | | |
|---|---|---|
| 817,207 | 4/1906 | Wheeler . |
| 2,290,307 | 7/1942 | Wicker . |
| 2,298,144 | 10/1942 | McNabb . |
| 2,552,205 | 5/1951 | Moss ................................ 224/908 X |
| 2,658,435 | 11/1953 | Sarvoy .............................. 224/908 X |
| 2,771,826 | 11/1956 | Shapiro . |
| 2,952,200 | 9/1960 | Welch . |
| 3,273,484 | 9/1966 | Lapsley ............................. 352/243 X |
| 3,826,513 | 7/1974 | Wolf . |
| 4,155,636 | 5/1979 | Reeberg ................................ 354/293 |
| 4,158,490 | 6/1979 | Gottschalk et al. ................... 352/243 |
| 4,327,986 | 5/1982 | Carter .................................... 354/293 |
| 4,348,034 | 9/1982 | Welt . |
| 4,514,067 | 4/1985 | Gallegos et al. ....................... 354/293 |
| 4,606,524 | 8/1986 | Conee .................................... 248/346 |
| 4,687,309 | 8/1987 | Breslau .................................... 354/82 |
| 4,826,187 | 5/1989 | Abbott et al. . |
| 4,951,072 | 8/1990 | Harvey et al. ............................ 354/80 |
| 5,064,062 | 11/1991 | Miller ................................. 206/316.2 |
| 5,294,947 | 3/1994 | Harrington .............................. 354/82 |

Primary Examiner—J. Casimer Jacyna
Attorney, Agent, or Firm—Dowell & Dowell

[57] ABSTRACT

An assembly for operatively supporting a camera from an individual's body which includes a storage case having an adjustable body encircling belt and a tripod stand having a vertically adjustable camera engaging unit mounted thereto. The tripod stand includes locking elements at the base of each of its legs which are selectively engageable with cooperative locking elements mounted to the surface of the storage case whereby when the locking elements of the legs of the tripod stand and the storage case are engaged, the assembly is supported from the individuals body leaving the individual free to use their hands without having to support the camera.

22 Claims, 5 Drawing Sheets

BODY MOUNTED CAMERA SUPPORT ASSEMBLY

BACKGROUND OF THE INVENTION

1. Field of the Invention

This invention is generally directed to supports utilized for stabilizing cameras during their use and more particularly to supports of the type which are designed to be worn by the photographer so that his or her hands are free for normal use such as for aiming, adjusting, focusing or otherwise manipulating the camera without having to support the camera. The invention includes a storage case which may be in the form of a conventional camera bag or hip pouch but which, in the preferred embodiment, includes a reinforced cover for providing a stable base upon which a camera tripod stand is selectively connected. In the preferred embodiment, the pouch or storage case includes a selectively adjustable body encircling belt which is stored when not in use within a rear pocket of the case. The tripod stand includes locking elements which are selectively engageable with cooperative locking elements provided along the lid of the storage case or pouch whereby when the locking elements are engaged, the stand is securely supported on the reinforced cover of the case or pouch. The camera is mounted to a head assembly which permits both pivotable and rotational movement of the camera and which head assembly is carried by a selectively vertically adjustable post which may be telescopically mounted to one of the legs of the tripod stand.

2. History of the Related Art

An important feature in the use of all types of cameras including still photograph cameras, movie cameras, and VCR cameras is the desire to maintain the cameras steady when pictures are being taken. One of the most universal supports for many types of cameras is a tripod stand which conventionally includes legs which are adjustable or collapsible relative to one another for transportation and storage and which are extendable into a triangularly support relationship when the stand is assembled for use. The three point contact feature of a tripod stand enables such stands to be utilized on support surfaces without regard to whether or not the surfaces are level, as, by simple adjustment of the legs of the tripod stand, a camera mounted thereto may easily be accurately horizontally aligned. To date, however, tripod assemblies for supporting cameras have found use only in instances where a camera is to remain stationary while pictures or movies are taken. Such assemblies have heretofore not been utilized where a camera is to be carried by an individual so that the camera is portable during its use.

There have been numerous support devices designed for facilitating the use of a camera when it is being carried by a photographer. Such devices, in some instances, provide some degree of stabilization for the camera and/or some measure of support for allowing the weight of the camera to be borne by the body of the photographer as opposed to being borne by their hands and arms, thereby allowing their hands and arms to be free to make the necessary adjustments to the camera when pictures are being taken. One early example of a body mounted camera support is disclosed in U.S. Pat. No. 817,207 to Wheeler. The camera support disclosed incorporates a belt having a pad mounted thereto to which a pivotable coupling is mounted. A shaft having a telescoping member extends from the coupling to a head portion which includes a spindle which is threadingly engageable with the base of a camera. A separate neck engaging strap extends from the head of the support assembly and about the neck of the photographer. As disclosed in the patent, however, it is, at all times, necessary to maintain at least one hand engaging the camera as the camera support assembly is free to pivot relative to the belt and neck of the photographer. Thus, the camera could easily fall to one side or the other, relative the individual's body, if not supported by either hand. Therefore, this type of support does not allow for the photographer to disengage the camera to allow the free use of both hands while the camera remains steadied.

In U.S. Pat. No. 2,952,200 to Welch, a very similar camera mounting assembly to that disclosed in Wheeler is shown in which the only improvement includes a pistol grip which forms part of the head assembly to which the camera is mounted. Again, the patent discloses the use of an upper body encircling belt which depends to a support cup in which the lower portion of a support rod is selectively seated. A separate neck strap is also provided. As with the camera support device disclosed in Wheeler, it is necessary that at least one hand be maintained on the pistol grip in order to steady the camera relative to the individual. A similar arrangement for a camera mount is disclosed in U.S. Pat. No. 4,687,309 to Breslau in which the neck strap has been eliminated so that, whenever the camera is not in use, the camera is simply pivoted to suspend from a main strap which also extends around the neck of the photographer. Again, it is necessary to utilize at least one hand to steady the camera when elevated to a use position.

In U.S. Pat. No. 2,771,826 to Shapiro, another camera support assembly which includes a body encircling belt and a separate neck encircling strap is disclosed. However, in order to provide additional stability, the base of the camera support rod is provided with a plurality of teeth which mesh with cooperative teeth which are also provided in a clip mounted to the front of the belt. This device provides lateral stability for the base of the rod and prevents some movement of the camera support rod when the hands are dropped from the camera. However, even with this type of assembly, when the camera is supported in a use position, swaying movement of the camera from side-to-side is possible and true steadying of the camera can only be maintained by utilizing one or the other of the photographer's hands to prevent such lateral movement. In addition, by supporting the camera from a single point of contact at the belt, there is increased stress provided at the point at which the belt is coupled to the base of the camera support rod. Such single point contact makes the device uncomfortable to wear as well as can cause possible failure of the camera support device by the amount of torque created between the camera support rod and the belt.

In U.S. Pat. No. 4,327,986 to Carter, another camera support device of the type disclosed in Wheeler is disclosed wherein steadying of the camera is accomplished by providing a pair of handles which extend from the base of a camera support rod. The handles are engageable along the sides of the photographer's torso and thereby prevent the bottom portion of the rod from swaying when the camera is elevated into a use position. However, with this type of assembly, should the photographer make any twisting movement of their upper torso, the camera support assembly can pivot thereby shifting the camera from its proper position.

As opposed to supporting cameras from an individuals body, in many instances, the storage or carrying cases which are used to transport cameras are utilized as a support to stabilize cameras during their use. Examples of camera carrying cases which are also utilized as supports for cameras during their use are disclosed in U.S. Pat. No. 2,290,307 to Wicker, U.S. Pat. No. 2,298,144 to McNabb, U.S. Pat. No. 4,606,524 to Conee and U.S. Pat. No. 5,064,062 to Miller. Unfortunately, none of the carrying cases disclosed in the aforementioned U.S. Patents is designed for being portable when the camera is in use and therefore the camera carrying cases must remain stationary to provide a stable support. The patent to McNabb does disclose that the camera case may be engageable with a portion of the photographer's torso, however, the camera carrying case, as well as the camera, must be supported by the individual's hands as there is no other support feature provided for stabilizing the camera relative to the individual's body.

In view of the foregoing, the prior art has not successfully provided camera supports for supporting photographic, VCR, movie and other cameras which are being carried by a photographer in such a manner that the photographer is free to utilize both hands either for adjusting the camera equipment or for other purposes while yet providing a stable base upon which the camera is mounted.

Some additional examples of prior art camera support devices are disclosed in U.S. Pat. No. 3,826,513 to Wolf U.S. Pat. No. 4,158,490 to Gottschalk et al, U.S. Pat. No. 4,348,034 to Welt and U.S. Pat. No. 4,826,187 to Abbott et al.

SUMMARY OF THE INVENTION

This invention is directed to a portable assembly for supporting a camera when in use in such a manner that a photographer is allowed to use both hands without having to use them for stabilizing the camera. The invention includes a storage case which may be in the configuration of a conventional camera case, hip storage pouch, hip purse or other type of article container which is designed to be worn or suspended from an individual's upper torso. In the preferred embodiment, the storage case includes a lid or cover having a reinforcing element associated therewith. The case may be covered with a leather, fabric or other type of material. A plurality of first locking elements are secured to the reinforced lid. When conventional storage cases or camera bags are being utilized, the first locking elements may be secured directly to the surface thereof and preferably to the upper surface which generally defines the lid of such cases. The storage case is provided with a belt which, in the preferred embodiment, is normally stored in a pocket at the rear of the storage case. The belt is adjustable so as to be securely worn about the waist of an individual. In the preferred embodiment, appropriate adjusting straps are provided at each side of the belt which are utilized to regulate the tension of the belt against the individual.

The invention further includes a camera support stand which, in the preferred embodiment, is a tripod stand having three legs having upper and lower ends. Second locking elements are provided at the lower ends of each of the legs which locking elements are engageable with the firstlocking elements to thereby support the stand from the storage case. A camera engaging head assembly is telescopically mounted relative to the legs of the camera support stand and, in the preferred embodiment, the head assembly is mounted to a post which is telescopically mounted with respect to a fixed central leg of the tripod stand. The outer legs of the tripod stand are adjustable relative to the center support leg and are locked thereto when opened into working relationship with respect to one another by a movable linkage and slide block arrangement. The head of the camera support stand preferably includes both a rotationally and pivotably movable camera engaging mount which allows a camera supported thereby to be appropriately aimed or maneuvered for picture taking.

The first and second locking elements are preferably bayonet type locking elements with either the male or female bayonet portion of the elements being mounted to the carrying case and the cooperative locking elements mounted to and extending from the lower portion of the legs of the tripod assembly. When the tripod stand is removed from the storage case, the locking elements associated therewith may be pivoted into a flush engagement with the upper surface of the case. In some embodiments, the tripod stand may be collapsed into a compact configuration and thereafter stored within the storage case together with the camera and related camera equipment.

It is the primary object of the present invention to provide a portable apparatus for use in stabilizing a camera which is carried by a photographer and which enables the cameras to be steadied during use while leaving the photographer's hands free to perform necessary adjustment to the camera or for other purposes.

It is also an object of the present invention to provide a combination body worn storage or carrying case and tripod support assembly for use in stabilizing cameras of all types so that the cameras may be mounted to the carrying cases when in use with the carrying case being selectively worn about the upper body of a photographer.

It is a further object of the present invention to provide a camera storage or carrying case which may be utilized as a support for a tripod to which a camera is mounted when in use and wherein the tripod is selectively locked to the case and wherein the carrying case is worn about the upper torso of an individual so that the camera is steadied even as the individual moves.

It is yet another object of the present invention to allow conventional hip pouches, camera bags, and other portable storage devices and purses to be modified to function as supports for steadying cameras during use wherein the storage devices are modified by providing locking elements therewith which are engageable with locking elements provided on a support stand to which a camera is secured thereby enabling such pouches, storage devices and bags to function as stabilizing supports for cameras when worn by an individual.

DESCRIPTION OF THE PREFERRED EMBODIMENT

Figure 1:
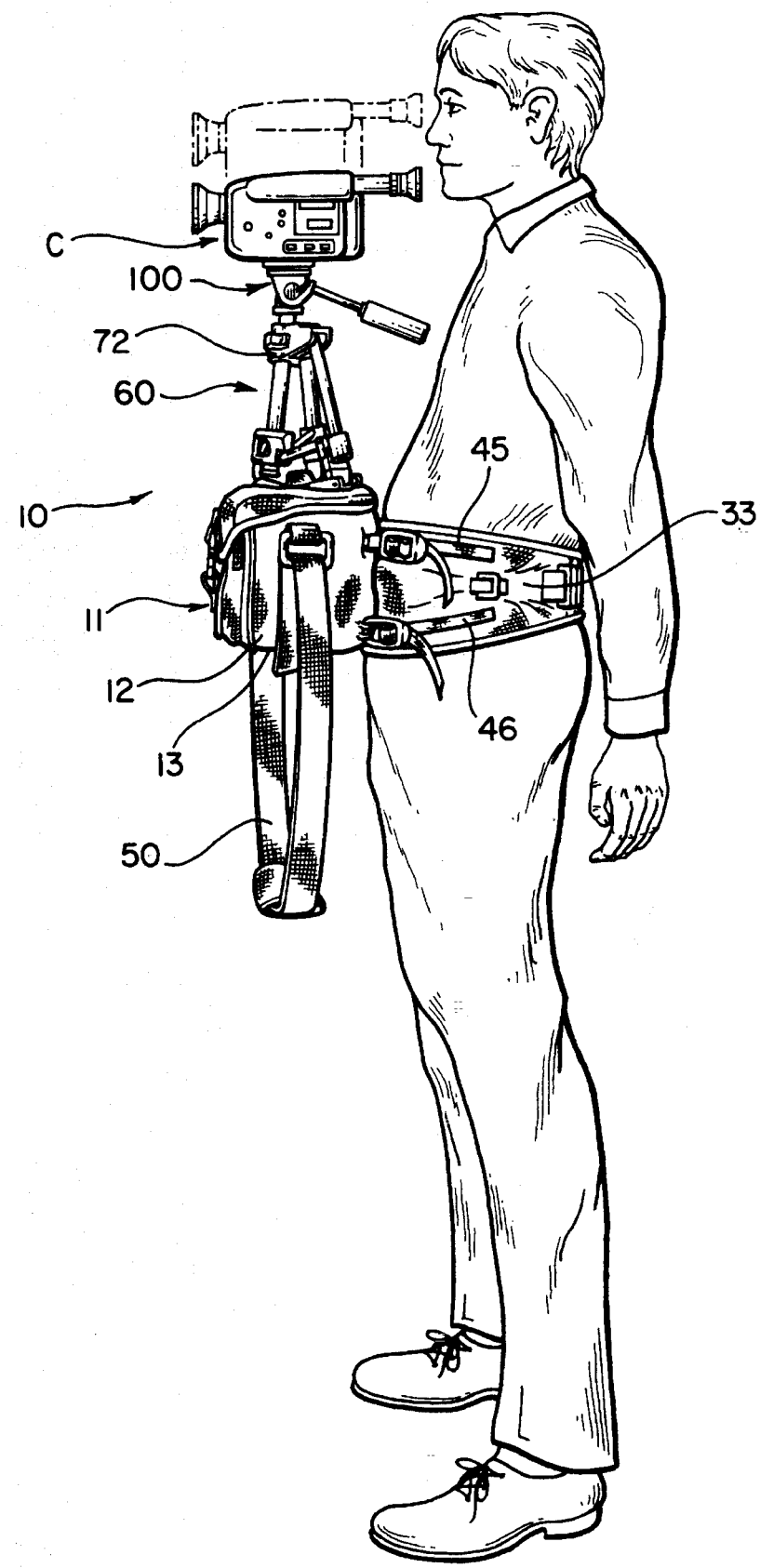
FIG. 1 is an illustrational view showing the invention worn about the waist of a photographer and showing a camera mounted thereto and showing the relative elevational movement of the camera in dotted line position.
Figure 2:
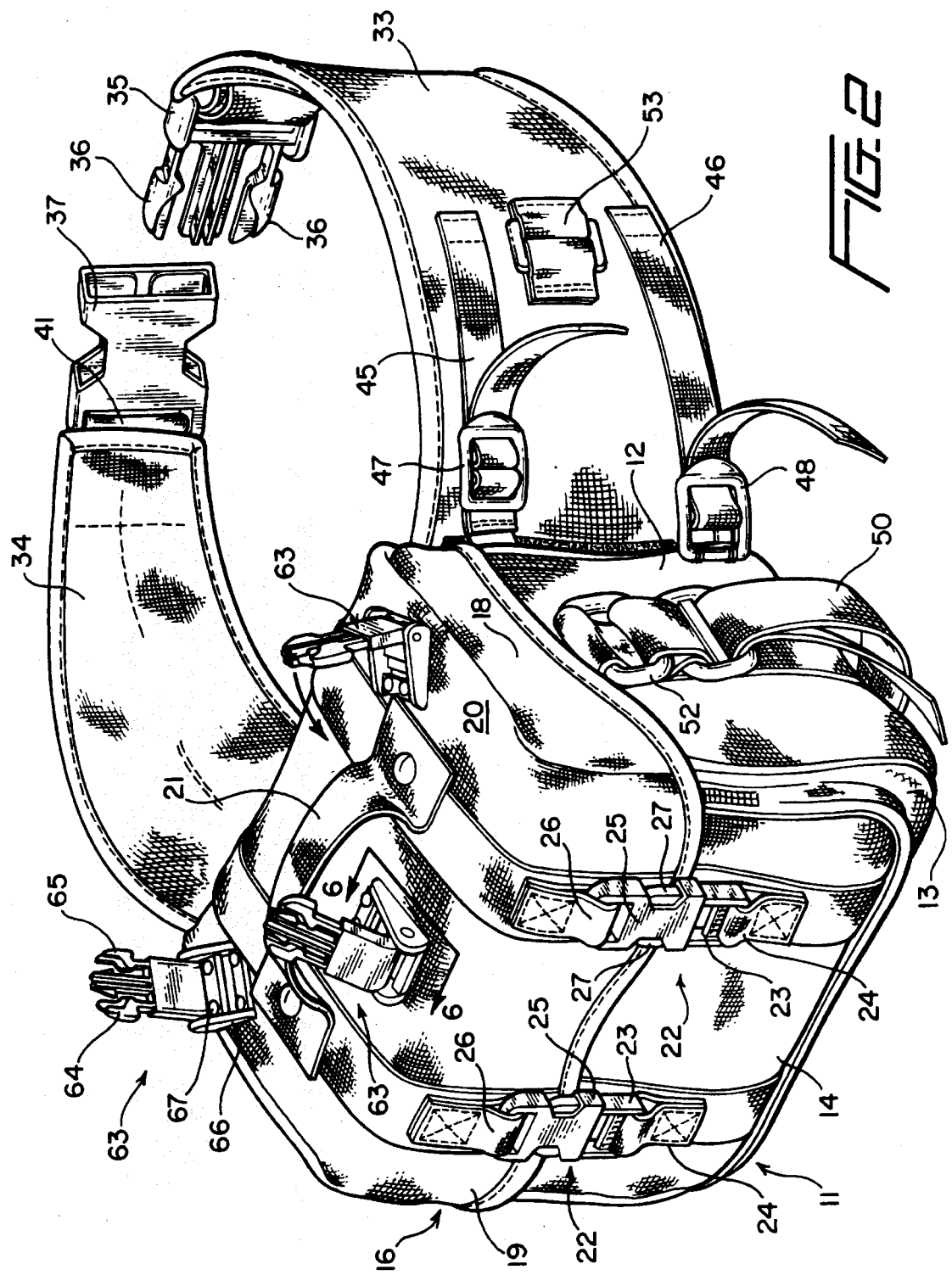
FIG. 2 is a front perspective view of the storage case and mounting belt of the present invention showing the locking elements associated with the storage case in a raised position.
Figure 3:
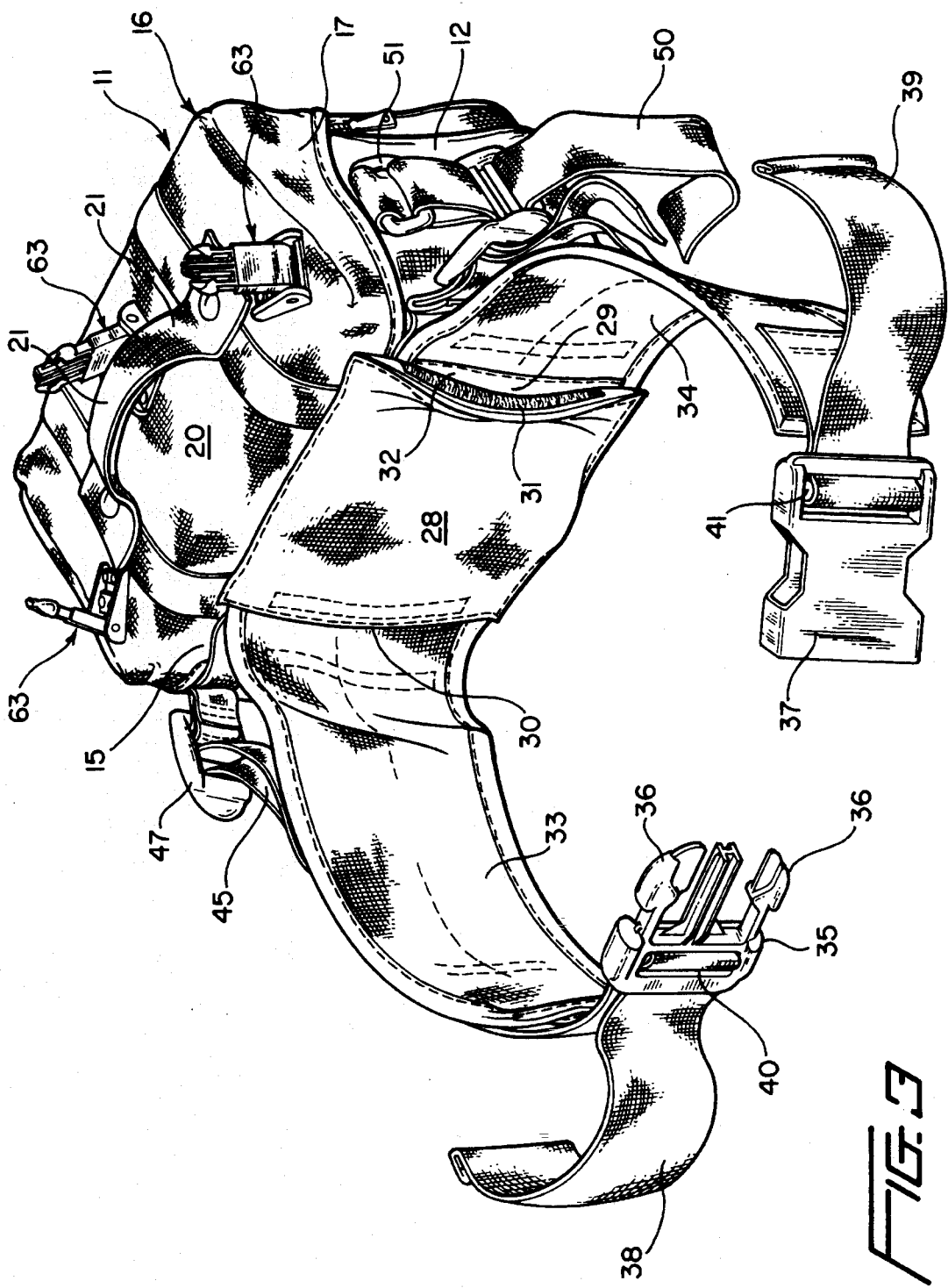
FIG. 3 is a rear perspective view of the storage case of FIG. 2 showing a rear pocket for receiving the belt when the belt is not in use.

With continued reference to the drawing figures, the camera support device 10 of the present invention is illustrated in FIG. 1 as providing a stable support for a camera "C". The camera shown is of the VCR type, however, any type of conventional camera may be mounted to the support assembly of the invention. As shown, the stability provided by the invention allows the photographer to stabilize the camera without having to utilize his hands thus his hands are free to focus the camera, rotate or pivot the position of the camera, or to otherwise perform other tasks while the camera remains securely positioned relative to his body.

The preferred embodiment will be discussed with respect to FIGS. 1—6, however, it should be noted that the invention also is directed to the use of conventional hip pouches, camera carrying cases, belt mounted purses and related storage or carrying cases which may be modified to be worn on the upper body of an individual and to provide for the interlocking of elements, as taught herein, which are necessary to support a camera during use. In the preferred embodiment, the device includes a storage case 11 having an interior storage compartment defined by opposite sidewalls 12, bottom wall 13 and front and rear walls 14 and 15. An upper opening into the storage case 11 is closed by a cover 16 having depending side portions 17 and 18 and front portion 19. The cover 16 further includes an upper surface 20 to which a handle 21 may be selectively secured. The cover is locked to the front 14 of the storage case 11 by a pair of bayonet snap locks 22 having male portions 23 secured by straps 24 to the front of the storage case and female portions 25 secured by straps 26 to the cover. The male locking elements include tabs 27 which when manipulated toward one another allow the male locking member 23 to be inserted or withdrawn from the female locking member 25 in a conventional manner.

Secured to the rear 15 of the storage case 11 is a storage pocket 28 having side openings 29 and 30 which are selectively secured by the use of opposing VELCRO™ or other hook-and-loop type engageable fabric strips 31 and 32. A pair of opposing belt sections 33 and 34 are normally stored by being tucked within the pocket 28, however, are shown in the drawing figures as being extended for use in mounting about the waist of an individual, such as shown in FIG. 1. Belt segment 33 includes an outer male locking element 35 having a pair of yieldable locking tabs 36 associated therewith which are insertable so as to lock within a female locking element 37 which is mounted to belt section 34. Each of the locking elements 35 and 37 are secured to the respective ends of the belt sections 33 and 34 by straps 38 and 39, respectively. The straps extend through openings 40 and 41 formed in the base of each of the locking elements 35 and 37 and thereby permit adjustment of the locking elements to lengthen or shorten the belt sections 33 and 34. As shown in FIG. 1, the engaging locking elements 35 and 37 are designed to engage at the rear of the individual's waist.

To provide further adjustment and tension to secure the case 11 relative to the individual's body, located on the outer surface of the belt elements 33 and 34 are upper and lower adjusting straps 45 and 46. Each of the adjustable straps 45 and 46 include free ends which extend through slide locks 47 and 48, respectively, so that when the free ends are pulled relative to the slide locks, further tension is placed on tightening the belt relative to the individual's body.

In the preferred embodiment, the storage case also includes a shoulder strap harness 50 which is mounted to ring elements 51 and 52 secured to the sides 12, respectively, of the carrying case. Also, rings 53 are provided along the belt sections 33 and 34 from which various items may be suspended.

Figure 6:
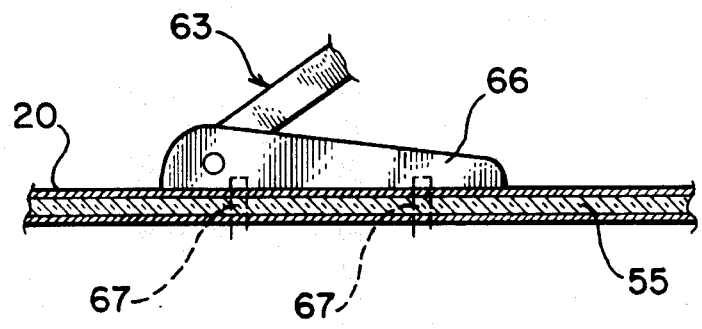
FIG. 6 is a partial cross-sectional view taken along lines 6—6 of FIG. 2.

With particular reference to FIG. 6, to provide further rigidity to the cover 16 of the storage case, at least the cover may include a reinforcing panel 55 to which the outer surface 20 of the cover is secured. The side, front and rear walls may be similarly reinforced with the interior of the carrying case having a fabric inner liner (not shown). The interior of the storage case may be compartmented so as to provide space for transporting a camera as well as for transporting camera equipment and a tripod assembly 60 associated with the support assembly of the present invention.

To support the camera tripod support assembly 60 relative to the storage or carrying case 11, a plurality of first locking elements 62 are securely mounted to the upper surface 20 of the cover 16. As shown, the first locking elements include male locking members 63 having pairs of resilient tabs 64 and 65 extending therefrom. The male locking members 63 are pivoted to base portions 66 which are riveted or otherwise secured through the upper surface 20 and reinforcing layer 55 as shown at 67 in FIG. 6. When the male locking members are not in use, they are pivoted, as shown by the arrow in FIG. 2, into flush relationship with respect to the upper surface 20 of the cover 16. In the preferred embodiment three male locking elements are positioned in spaced relationship relative to the upper surface of the storage case.

Figure 4:
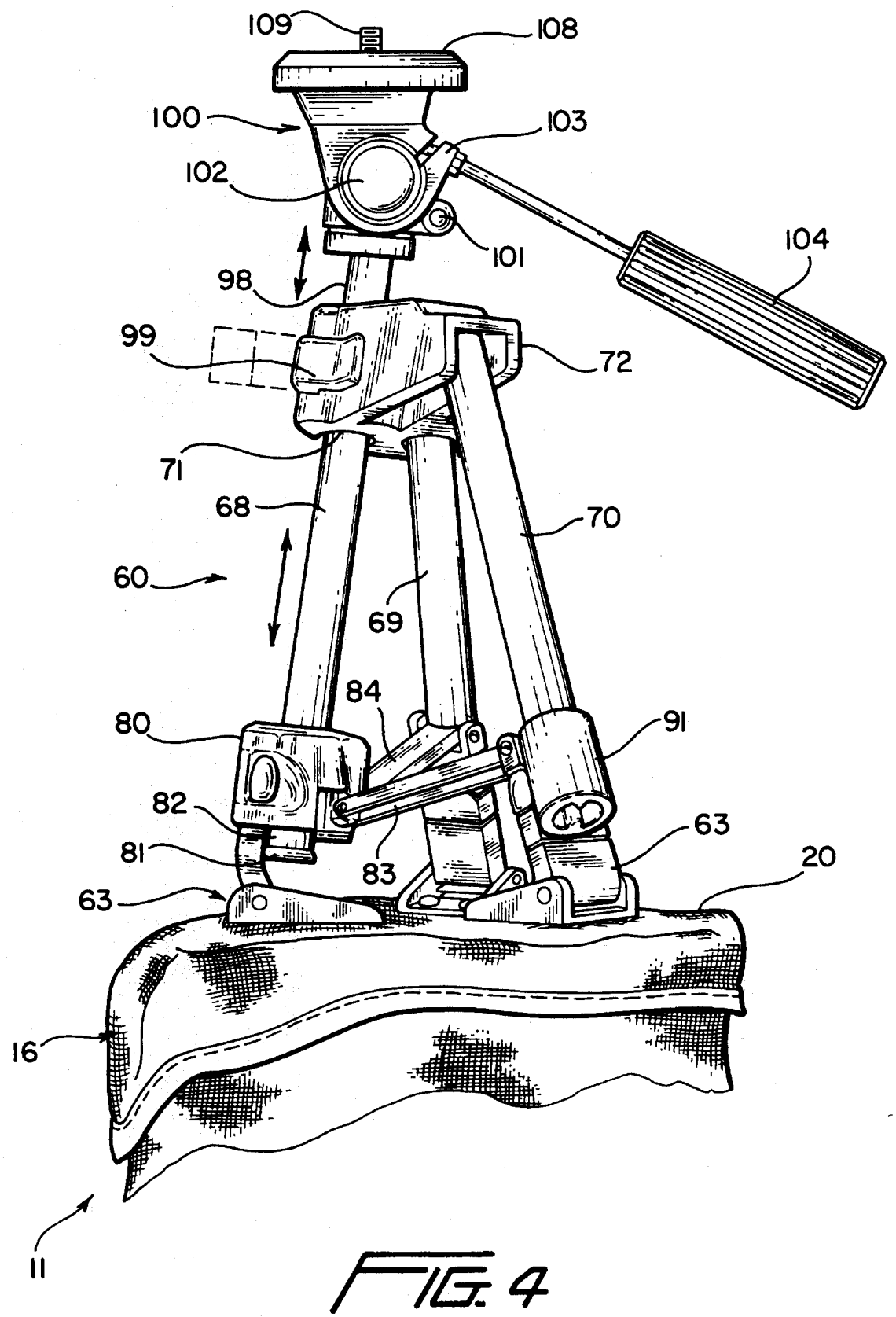
FIG. 4 is a perspective view of the camera tripod stand and camera mounting head of the present invention showing the tripod stand being lockingly engaged with the first locking elements associated with the storage case and showing a pivotable locking member which allows vertical adjustment of the camera mounting head as indicated by the arrow in the drawing figure.
Figure 5:
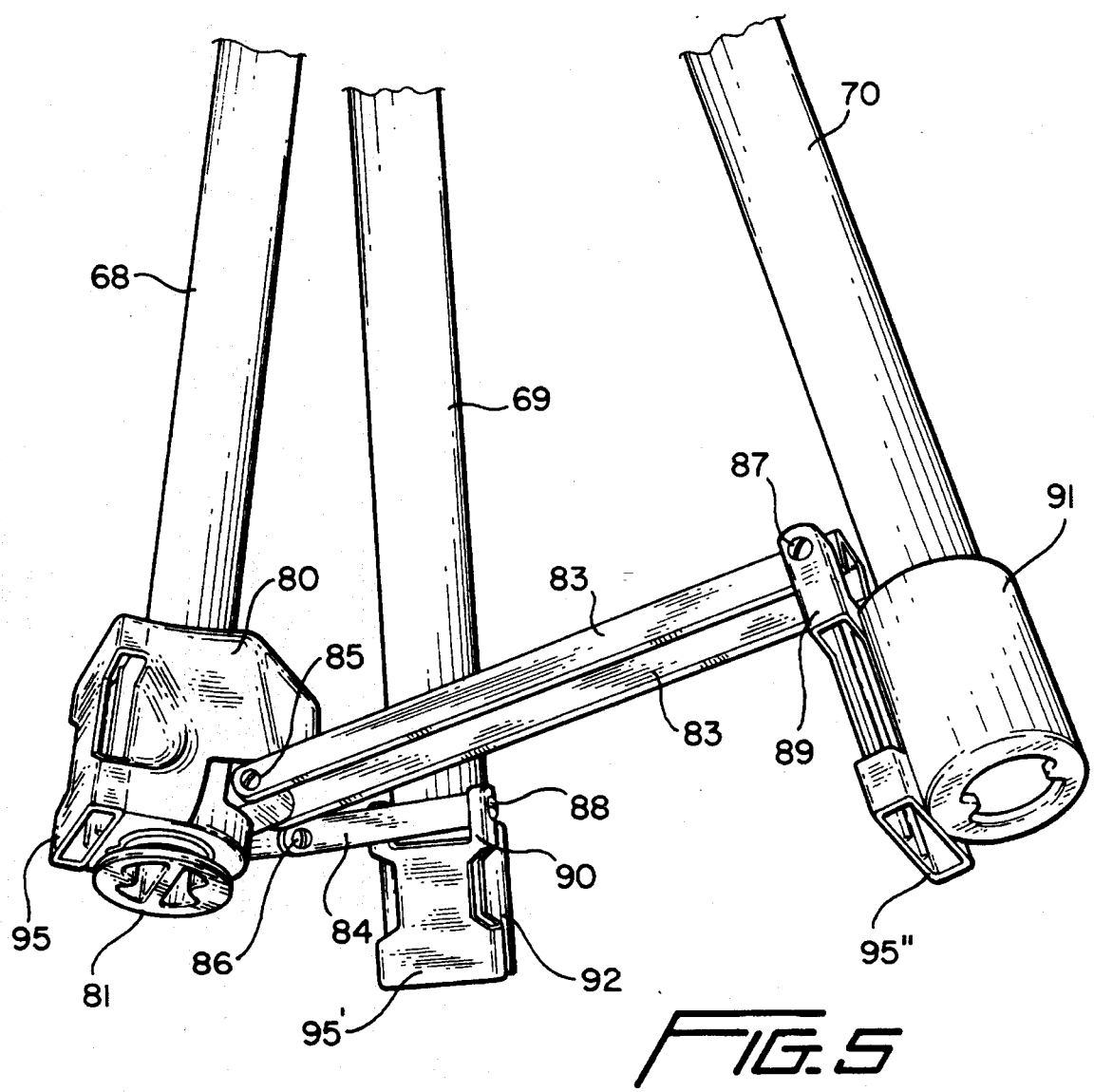
FIG. 5 is an enlarged perspective view of the lower ends of each of the legs showing the locking elements associated therewith and further showing the linkage mechanism for rigidly securing the legs relative to one another.

With particular reference to FIGS. 4 and 5 the camera support assembly 60 is preferably a tripod structure having a central fixed leg 68 and outer pivotable legs 69 and 70. The central leg 68 includes an upper portion which extends through an opening 71 through a collar 72 and is generally rigidly secured with respect to the collar 72. The legs 69 and 70 however, have upper ends which are pivotably mounted to the collar 72 so that the legs may be either drawn into a close generally parallel proximity to the central leg 68 for storage or pivoted to an expanded position for use, as is shown in FIG. 4 and FIG. 1. The opening and closing of the movable legs 69 and 70 relative to the central fixed leg 68 is controlled by a slide block 80 which is mounted about the fixed leg 68 and is movable along the length thereof. The lower end of the center leg 68 includes a stop flange 81 which prevents the block from becoming disengaged and sliding off the lower end 82 of the leg. The slide block is united by pairs of linkages 83 and 84 which are secured at one end to pivot pins 85 and 86 associated with the slide block 80 and at their other end to pivot pins 87 and 88 which are mounted to brackets 89 and 90 which are secured to sleeves 91 and 92. The sleeves are securely mounted about the lower ends of each of the movable legs 69 and 70. Each of the parallel linkages 83 and 84 permit the movable legs 69 and 70 to be collapsed or pivoted relative to the fixed leg 68 as the slide block assembly is moved upwardly, as shown by the arrow in FIG. 4. As the slide block 80 moves upwardly, the parallel linkages 83 and 84 are pulled so as to extend generally parallel with respect to the central leg 68.

This movement draws the legs 69 and 70 adjacent to the center leg 68 as the linkages pivot relative to the brackets 89 and 90 which are fixed relative to the lower ends of the legs 70 and 69. This arrangement also firmly locks the legs when the sliding block assembly is moved to its lower position, as shown in FIG. 5, as the linkages 83 and 84 assume a generally horizontal position and can not be forced to close the legs together without the sliding block 85 moving vertically.

In order to lock the tripod stand 60 relative to the storage or carrying case, second locking elements 95 are provided for each of the legs 68, 69 and 70. In the preferred embodiment, and as shown in FIG. 5, the slide block 80 includes a female locking receptacle 95 which is integrally formed therewith and which has an operational configuration similar to the locking element 37 associated with the belt. When the slide block is brought all the way to its lower position, as shown in FIG. 4, the locking tabs 64 and 65 of the central male locking member 63 are received therein and when expanded interlock locking element 63 with locking element 95. As shown, the locking tabs 64 and 65 may be engaged and urged together in order to release the male locking element 63 from the female locking element 95.

The sleeves 91 and 92 secured to the lower ends of each of the movable legs 69 and 70 also include female locking elements such as shown at 95' and 95". The female locking elements 95' and 95" receive the locking tabs 64 and 65 of the outer male locking members 63 mounted to the cover 16 of the storage case. Once each of the locking elements 63 are engaged with elements 95, 95' and 95", the tripod mount is securely mounted to the storage case.

Although a tripod stand is shown, it is possible that in some instances, a fewer or greater number of legs may be incorporated with stand 60. If two legs are used, it is preferred that they be spaced and movable as are legs 69 and 70. A center leg, similar to that shown at 68, could also be provided, but not for use in mounting the stand to the lid or cover of the bag.

The camera support stand 60 further includes a support post or shaft 98 which is telescopically mounted within the front leg 68 of the tripod assembly. A pivotable lock 99 is mounted to the collar 72 and, when moved to the dotted line position shown, allows the post 98 to be raised or lowered relative to the collar and within the leg 68. When the post has been moved to a desired position, the locking tab is moved to the full line position shown in drawing FIG. 4. Mounted to the post 98 is a camera support head assembly 100 which includes a rotatable collar 101 by way of which the head assembly may be rotated in a plane perpendicular relative to the elongated axis of the post 98. Further, the head assembly includes a pivot shaft 102 and clamp 103 which is adjustably controlled by a handle 104 which, when screwed in or out, adjusts the clamping element 103 to lock it relative to the pivot pin 102. By loosening the clamping force about the pivot pin 102, the head assembly may be pivoted forwardly or rearwardly relative to the post 98. Therefore, the head assembly may be rotated in a plane perpendicularly with respect to the tripod support stand and may be pitched forwardly or rearwardly relative to the post 98 to permit substantially universal adjustment of the head when using a camera mounted thereto.

The upper portion 108 of the head assembly forms a base for stabilizing the bottom of the camera "C" which is threadingly engaged to a spindle 109 extending from the base 108.

With reference to FIG. 1, once the tripod stand 68 has been locked to the upper surface of the storage or carrying case, the photographer is free to maneuver the camera by adjusting the head element carried by the vertically adjustable post 98. The photographer need not provide any stabilization through the use of his or her hands to support the camera and therefore the hands are free to either realign, focus, control or otherwise manipulate the camera or to preform other tasks. When the camera is no longer in use, it is simply removed from the spindle 109 of the support head 100. Thereafter the post 98 is vertically collapsed into the support leg 68 by movement of the locking element 99. The tabs 64 and 65 of each of the locking elements 63 are thereafter urged toward one another and released from the female locking elements 95, 95' and 95" associated with each of the legs 68, 69 and 70. Thereafter, the slide block 80 is raised along the fixed leg 68 of the tripod assembly thereby causing the parallel linkages 83 and 84 to draw in the movable legs 69 and 70 until they are generally parallel in closely spaced relationship to the front leg 68. The tripod support stand may thereafter be placed within the storage or carrying case along with the camera. The male locking members 63 are thereafter pivoted into generally flush engagement with the top of the case and the belt sections 33 and 34 are tucked within the rear pocket 28.

It should be emphasized that the storage or carrying case may be formed of different materials including leather, simulated leather, canvas, cloth and may be reinforced as desired. Preferably, some type of reinforcing should be provided in the lid or cover 16 to provide additional stabilization for a camera. However, less stable carrying cases may be utilized. In some instances, a separate strap may be provided to extend from the storage case and about the neck of the individual and back to the case and thereby provide an additional degree of support and rigidity to allow a camera to be stabilized without the use of an individual's hands. This is especially true when the stand incorporates less than three legs which are locked to the storage case.

I claim:

1. An apparatus for supporting a camera in a stable position from an individual's torso, comprising, a storage case having an inner storage compartment which is defined by upper and lower walls, opposite side walls and front and rear walls, belt means extending from said storage case for mounting the storage case to the individual's torso, a plurality of first locking elements mounted in spaced relationship to one another to said storage case, a stand having at least two adjustable legs, each of said legs having upper and lower ends, a camera engaging means mounted to said stand and extending above said upper end of said legs, second locking elements mounted to said lower end of said legs, and said first and second locking elements being releasably engageable with one another to thereby mount said stand to said storage case.

2. The apparatus of claim 1 in which said camera engaging means includes a vertically adjustable shaft, and means for selectively locking said shaft in an adjusted position relative to said legs.

3. The apparatus of claim 2 in which said camera engaging means includes a head assembly which is rotationally and pivotally mounted to said shaft, and means for connecting the camera to said head assembly.

4. The apparatus of claim 3 including a pocket mounted to said rear wall of said storage bag, said belt means including first and second sections which extend outwardly from said storage case, each of said first and second sections having outer ends, means for securing said outer ends in joined relationship with respect to one another, and said first and second sections of said belt means being selectively receivable within said pocket.

5. The apparatus of 4 in which said pocket includes opposite end portions defining openings, and means for selectively closing each of said opposite end portions.

6. The apparatus of claim 5 including adjusting strap means, said adjusting strap means being connected to at least one of said first and second sections of said belt means, and means for allowing selective adjustment to the length of said strap means.

7. The apparatus of claim 3 in which said stand is a tripod having three legs, said stand including a collar, said upper ends of said legs being connected to said collar, and means for pivotably connecting at least two of said legs to said collar.

8. The apparatus of claim 7 including a generally fixed leg, an opening through said collar, said upper end of said fixed leg extending into said opening, said shaft being slidingly receivable within said fixed leg.

9. The apparatus of claim 8 including a slide block mounted to said fixed leg and being movable with respect thereto between said upper and lower ends thereof, first and second linkage means having first and second end portions, first pivot means for securing said first end portions of said first and second linkage means to said slide block, and second pivot means for securing said second end of said first and second linkage means relative to said lower ends of said at least two legs.

10. The apparatus of claim 9 in which each of said second locking elements includes a female receptacle, and each of said first locking elements includes a pair of male locking tabs extending outwardly therefrom which are receivable within said female locking receptacles, said male locking tabs being pivotally mounted on said storage case so as to extend outwardly therefrom for selective engagement with said second locking elements and to be substantially flush with said storage case when disengaged from said second locking elements.

11. The apparatus of claim 10 in which said upper wall of said storage case includes a reinforcing member.

12. The apparatus of claim 11 in which each of said first locking means includes a base portion, means for connecting said base portion to said reinforcing member.

13. The apparatus of claim 12 in which said male locking tabs are pivotable with respect to said base portions.

14. The apparatus of claim 1 including a pocket mounted to said rear wall of said storage bag, said belt means including first and second sections which extend outwardly from said storage case, each of said first and second sections having outer ends, means for securing said outer ends in joined relationship with respect to one another, and said first and second sections of said belt means being selectively receivable within said pocket.

15. The apparatus of claim 14 including adjusting strap means, said adjusting strap means being connected to at least one of said first and second sections of said belt means, and means for selectively adjusting the length of said strap means.

16. The apparatus of claim 14 in which said upper wall of said storage case includes a reinforcing member, and each of said first locking means includes a base portion mounted to said reinforcing member.

17. The apparatus of claim 1 in which said inner storage compartment is of a size to house said stand and the camera when the camera is not in use.

18. An apparatus for supporting a camera in a stable position from an individual's torso, comprising, a storage case having upper and lower walls, opposite side walls and front and rear walls which define an inner storage compartment, belt means extending from said storage case for mounting the storage case to the individual's torso, a plurality of first locking elements mounted in spaced relationship to one another on said upper wall of said storage case, a tripod stand having three legs, each of said legs having upper and lower ends, a camera engaging means mounted to said tripod stand and extending above said upper end of said legs, second locking elements mounted to said lower end of said legs, and said first and second locking elements being releasably engageable with one another to thereby mount said tripod stand to said storage case.

19. The apparatus of claim 18 in which said stand includes a collar to which said legs are mounted, an opening through said collar, said upper end of one of said legs extending into said opening and said camera engaging means including a shaft being slidingly receivable within said one of said legs.

20. An apparatus for supporting a camera in a stable position from an individual's torso, comprising, a storage case having an inner storage compartment which is closed by an upper reinforced lid, belt means extending from said storage case having first and second sections for mounting the storage case to the individual's torso, a plurality of first locking elements pivotally mounted in spaced relationship to one another on said lid of said storage case, a stand having at least two legs, each of said legs having upper and lower ends, a camera engaging means mounted to said stand and extending above said upper end of said legs, second locking elements mounted to said lower end of at least two of said legs, and said first and second locking elements being releasably engageable with one another to thereby mount said stand to said storage case.

21. The apparatus of claim 20 in which said stand is a tripod having three legs, said stand including a collar, said upper ends of said legs being connected to said collar, a slid block mounted about one of said legs, and linkage means connected to said slide block and to each of the other of said three legs.

22. The apparatus of claim 20 in which said inner storage compartment is of a size to house said stand and the camera when the camera is not in use.

* * * * *